United States Patent Office.

ALAXANDR BOUDROU, OF PHILADELPHIA, PENNSYLVANIA.

Letters Patent No. 65,535, dated June 11, 1867.

IMPROVED BOOT-BLACKING.

*The Schedule referred to in these Letters Patent and making part of the same.*

TO ALL WHOM IT MAY CONCERN:

Be it known that I, ALAXANDR BOUDROU, of the city of Philadelphia, State of Pennsylvania, have invented a new and useful Boot-Blacking; and I do hereby declare the following to be a full and exact description of the same.

My invention consists of certain composition for blacking leather boots, and other articles of leather; the same being applicable with modifications hereinafter specified for blacking stoves and other articles of iron, and also for coloring edge tools, hardware, and other articles of polished iron.

To make the boot-blacking, I employ one gallon of alcohol, two pounds of gum shellac, twenty drops of sweet oil, one ounce of lamp-black.

To make the stove-blacking I employ one gallon of alcohol, two pounds of gum shellac, one-half ounce of lamp-black.

To make the composition for coloring polished iron, I employ one gallon of alcohol, two pounds of gum shellac, and Prussian blue, or other coloring sufficient to give the composition any desired shade of color.

The ingredients above named are in each instance mixed well together.

The above-stated proportions I have found to produce good results, but I do not wish to confine myself to exactness in this respect, as there may be considerable deviation from the proportions given and desirable results be still obtained. The blacking for boots and other articles of leather, and that for stoves and other articles of iron, may be made thicker or thinner by using of the alcohol more or less than the quantity stated.

Having thus described my invention, I claim, and desire to secure by Letters Patent—

The compositions composed of the ingredients named for blacking leather boots, and other articles of leather, stoves, and other articles of iron, and for coloring polished iron, substantially as described.

ALAXANDR BOUDROU.

Witnesses:
    A. P. FITZHUGH,
    CHAS. DOTTS.